(12) United States Patent
Inamasu et al.

(10) Patent No.: US 7,630,090 B2
(45) Date of Patent: Dec. 8, 2009

(54) OVEN WIDTH MEASUREMENT INSTRUMENT AND PUSH-OUT RAM PROVIDED WITH THE INSTRUMENT

(75) Inventors: Hironobu Inamasu, Kakogawa (JP); Nobuki Takayama, Kakogawa (JP); Manabu Sato, Kakogawa (JP); Hirofumi Yamashita, Kakogawa (JP)

(73) Assignee: Kansai Coke and Chemicals Co., Ltd., Hyogo (JP)

( * ) Notice: Subject to any disclaimer, the term of this patent is extended or adjusted under 35 U.S.C. 154(b) by 0 days.

(21) Appl. No.: 12/224,428

(22) PCT Filed: Feb. 26, 2007

(86) PCT No.: PCT/JP2007/053493

§ 371 (c)(1),
(2), (4) Date: Aug. 27, 2008

(87) PCT Pub. No.: WO2007/099897

PCT Pub. Date: Sep. 7, 2007

(65) Prior Publication Data

US 2009/0103101 A1    Apr. 23, 2009

(30) Foreign Application Priority Data

Feb. 28, 2006   (JP) .............................. 2006-052443

(51) Int. Cl.
*G01B 11/14* (2006.01)
(52) U.S. Cl. ..................................................... 356/614
(58) Field of Classification Search ......... 356/614–624, 356/213–236
See application file for complete search history.

(56) References Cited

U.S. PATENT DOCUMENTS 4,068,125 A * 1/1978 Bell ........................... 250/340

FOREIGN PATENT DOCUMENTS

| EP | 1 340 799 A1 | 9/2003 |
|----|---|---|
| JP | 62-293112 A | 12/1987 |
| JP | 5-180623 A | 7/1993 |
| JP | 7-294218 A | 11/1995 |
| JP | 8-100180 A | 4/1996 |
| JP | 2002-213922 A | 7/2002 |

* cited by examiner

*Primary Examiner*—Michael P Stafira
(74) *Attorney, Agent, or Firm*—Birch, Stewart, Kolasch & Birch, LLP

(57) ABSTRACT

An oven width measuring instrument capable of measuring the oven width continuously while being subject to no restrictions of measurement area or measuring time has: a sensor unit SU composed of an integrated combination of laser displacement sensors 16 and 17 each containing a beam emitting element and a beam receiving element in an outer package, a plurality of plate-like Peltier elements 20*a*-20*d* surrounding the outer package and arranged so as to direct their heat absorbing faces toward the outer package, an aluminum inner frame 18 for embedding gaps between the outer package and the heat absorbing faces of the Peltier elements, and cooling fin groups 21*a*-21*d* arranged on the heat radiating faces of the Peltier elements; and a housing 13 having an introduction part for introducing cooling air, a discharging part for discharging the cooling air used for cooling, and measurement windows 26 and 28 through which laser beams are passed. The sensor unit SU is accommodated in the housing.

10 Claims, 4 Drawing Sheets

(a)

(b)

OVEN WIDTH MEASUREMENT INSTRUMENT AND PUSH-OUT RAM PROVIDED WITH THE INSTRUMENT

TECHNICAL FIELD

The present invention relates to an oven width measuring instrument and a push-out ram provided with the instrument suitable for measuring the oven width in the high-temperature environment in the oven.

BACKGROUND ART

Coke ovens have a structure wherein a carbonizing chamber and a combustion chamber are alternately arranged in the direction of coke oven battery. From a coal charging car which travels on the top of the coke oven in the direction of coke oven battery, coal is charged into each of the carbonizing chambers, and heat from each of the combustion chambers is transferred to the carbonizing chambers. In such a way, the charged coal is subjected to dry distillation, so as to produce coke.

Many of the coke ovens of this type have gone through over thirty years since they were built. Thus, the coke ovens have become decrepit. About firebricks which constitute side walls of the carbonizing chambers, which will be referred to as oven walls hereinafter, a cycle is repeated wherein carbon adhering to damaged regions of the oven walls is peeled by push-out of coke or charge of coal so that the oven walls are further damaged. As a result, factors of hindering the oven operation, such as a deformation of the oven walls, have been standing out.

Under such a situation, grasping the state of oven walls has become a very important inspection item for keeping a stable oven operation.

In carbonizing chambers in a coke oven, oven walls are opposed to each other with a narrow width. When the oven walls are damaged or worn away, the distance between the two wall surfaces becomes large. Thus, when the oven width is measured, the state that the oven walls are damaged or worn away can be guessed.

Thus, as an instrument for measuring the oven width, disclosed is a structure wherein a pair of noncontact distance meters which can be directed to individual oven walls of carbonizing chambers is mounted to a ram beam of a coke pushing-out machine in, for example, Japanese Unexamined Patent Publication No. 62-293112.

In this oven width measuring instrument, a water cooling jacket receives therein the noncontact distance meters in such a manner that measurement can be performed in the carbonizing chambers, the temperature of which may rise up to 1000° C. or higher. According to this structure, it is essential to lay a cooling pipe for supplying cooling water to the water cooling jacket and returning heatup water used for cooling from the water cooling jacket. Thus, it is inevitable that the cooling device attached to the oven width measuring instrument is made large-sized.

Furthermore, the distance over which the cooling water can be supplied is restricted by the pump discharging performance, and others, there is an inconvenience that the oven width cannot be continuously measured while the distance meter moves to the individual carbonizing chambers.

As an oven width measuring instrument without a cooling pipe, for example, Japanese Unexamined Patent Publication No. 2002-213922 discloses an oven width measuring instrument having a structure wherein an oven width distance meter and a power supply device are accommodated in a heat absorbing box and measured data of the oven width are transmitted through a transmitting device set in the heat absorbing box wirelessly.

The heat absorbing box is made of a jacket filled with liquid, and the outside of the heat absorbing box is covered with a heat insulating material. According to such an oven width measuring instrument, the measurement area is not restricted since no cooling pipe is required.

However, according to the oven width measuring instrument described in the Japanese Unexamined Patent Publication No. 2002-213922, the continuation of the measurement becomes unable at the time when the temperature of the liquid inside the water cooling jacket reaches the service temperature limit of the oven width measuring instrument. Thus, the measurement undergoes time restriction.

DISCLOSURE OF THE INVENTION

The present invention has been made, considering problems of oven width measuring instruments in the prior art as described above, and provides an oven width measuring instrument and a push-out ram provided with the instrument making it possible to measure the oven width continuously and stably while being subject to no restrictions of measurement area or measuring time.

The subject matter of the oven width measuring instrument according to the present invention is to include: a sensor unit composed of an integrated combination of a laser displacement sensor containing a beam emitting element and a beam receiving element in an outer package, a plurality of plate-like thermoelectric cooling elements surrounding the outer package and arranged so as to direct their heat absorbing faces toward the outer package, a thermal conductor embedded in the gap between the outer package and the heat absorbing faces of the thermoelectric cooling elements, and cooling fins arranged on heat radiating faces of the thermoelectric cooling elements; and a housing having an introduction part for introducing cooling air, a discharging part for discharging the cooling air used for cooling, and a measurement window through which a laser beam is passed, and accommodating the sensor unit.

When the sensor unit is accommodated in the housing in the oven width measuring instrument so as to interpose a tubular heat insulating part between the sensor unit and the housing, a cooling passage for causing cooling air to flow can be formed between an outer wall of this heat insulating part and an inner wall of the housing.

Preferably, a heat insulating material is adhered to the inner wall of the housing.

When the peripheries of the cooling fins are closed by the tubular heat insulating part, gaps between the individual cooling fins can be made as a second cooling passage in which the cooling air is caused to flow.

The subject matter of the push-out ram provided with an oven width measuring instrument according to the present invention is that the oven width measuring instrument which has the above-mentioned structure is set to a ram beam of the push-out ram which is a push-out ram arranged in a coke oven.

In the push-out ram provided with the oven width measuring instrument, the following can be accommodated in a heat insulating pipe laid on the ram beam: a hose for supplying cooling air to the oven width measuring instrument, a cable for supplying a power source to the laser displacement sensor and the thermoelectric cooling elements, and further outputting oven width measured data, and a cable for transmitting a control signal for controlling the temperatures of the thermoelectric cooling elements.

The push-out ram may be equipped with a tank for storing the cooling air and a compressor for keeping the cooling air in this tank at a predetermined pressure.

According to the oven width measuring instrument of the present invention and the push-out ram provided with the instrument, the oven width can be continuously and stably measured while being subject to no restrictions of measurement area or measuring time.

BEST MODE FOR CARRYING OUT THE INVENTION

Figure 1:
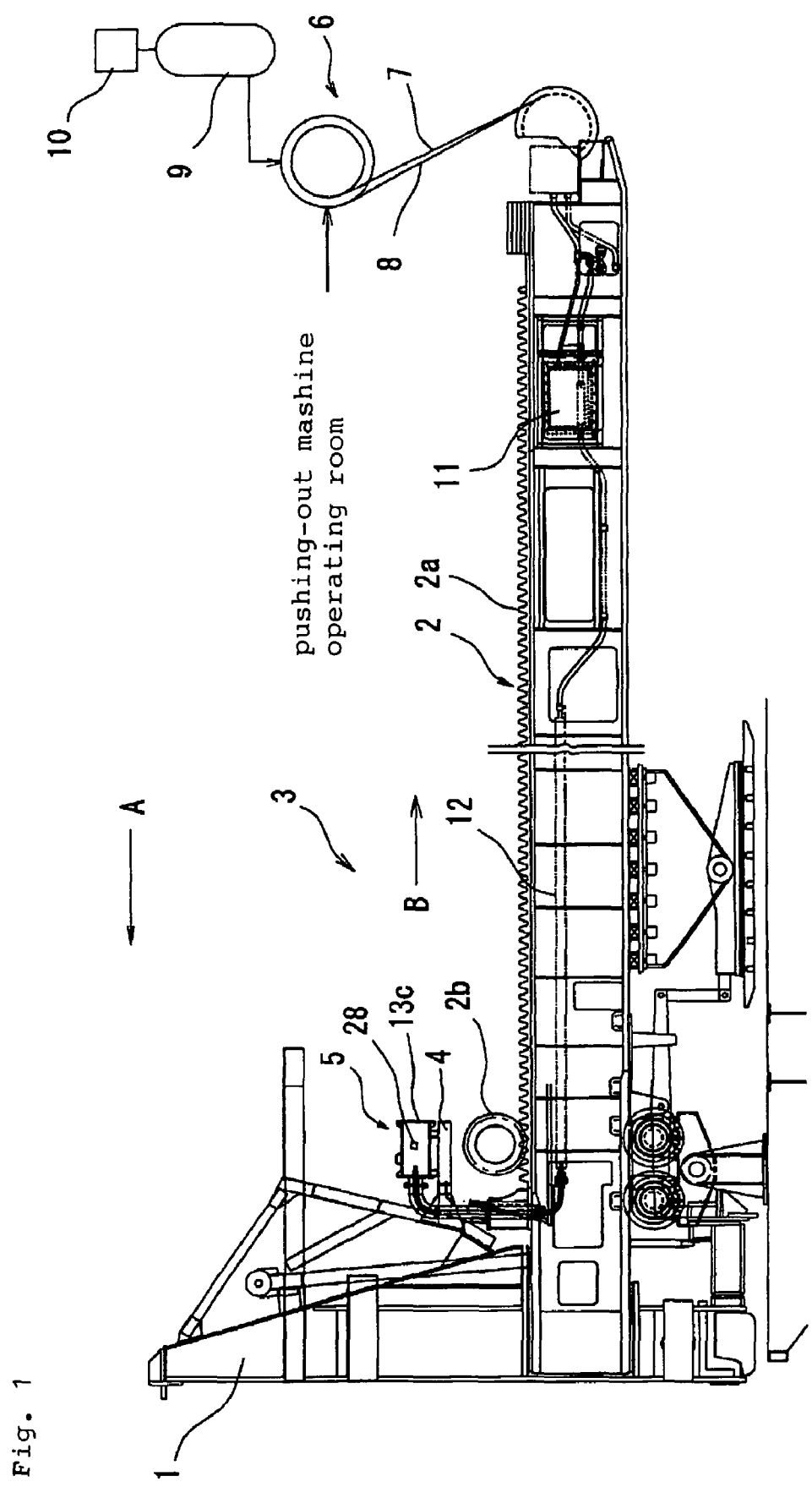
FIG. 1 is a side view illustrating a state that an oven width measuring instrument according to the present invention is set to a push-out ram.

The present invention will be described in detail hereinafter on the basis of embodiments illustrated in the drawings.

FIG. 1 is a view illustrating a structure in which an oven width measuring instrument according to the present invention is mounted on a ram beam of a coke pushing-out machine.

In FIG. 1, the coke pushing-out machine is equipped with a push-out ram 3 composed mainly of a ram head 1 and a ram beam 2 for reciprocating this ram head 1 in the horizontal direction. Red-hot coke obtained by dry distillation in carbonizing chambers of a coke oven is pushed outside the oven by means of the ram head 1.

A supporting stand 4 is stood over the ram beam 2 and near the ram head 1. An oven width measuring instrument 5 is mounted on this supporting stand 4.

In FIG. 1, A represents the direction along which the push-out ram 3 is pushed out.

A signal system of the oven width measuring instrument 5 is connected to a controller, which will be detailed later, in a pushing-out machine operating room not illustrated through a signal/power supply cable 7 wound off from one end side of a drum in a winder 6.

The signal system specifically includes power supply lines for supplying a power source to laser displacement sensors and Peltier elements, which will be detailed later, as thermoelectric cooling elements, output lines for outputting oven width data measured with the laser displacement sensors, control signal lines for controlling the temperatures of the Peltier elements, and the like.

A cooling system for cooling the oven width measuring instrument 5 is connected to a tank 9 for storing cooling air through a hose 8 wound off from the other end side of the drum in the same winder 6. To this tank 9 is connected a compressor 10 for keeping the cooling air at a predetermined pressure (pressure making it possible to supply the same pressure as lost by a pressure loss in the pipe and the like, for example, 0.4-0.7 MPa). The winder 6, the tank 9 and the compressor 10 are mounted on the pushing-out machine.

Reference numeral 11 represents a converter including a power supply device for an amplifier unit for amplifying oven width signals outputted from the laser displacement sensors inside the oven width measuring instrument 5, the laser displacement sensors, and the Peltier elements. The converter is arranged at the rear end side of the ram beam 2, which is not easily affected by heat from the carbonizing chambers that are in a high temperature state.

The signal/power supply cable 7 and the hose 8 are passed from the rear end of the ram beam 2 through a heat insulating pipe 12 laid inside the ram beam 2 so as to be connected to the oven width measuring instrument 5 set on the front end side of the ram beam 2. As the signal/power supply cable 7, a heat resistant cable is used.

Figure 2:
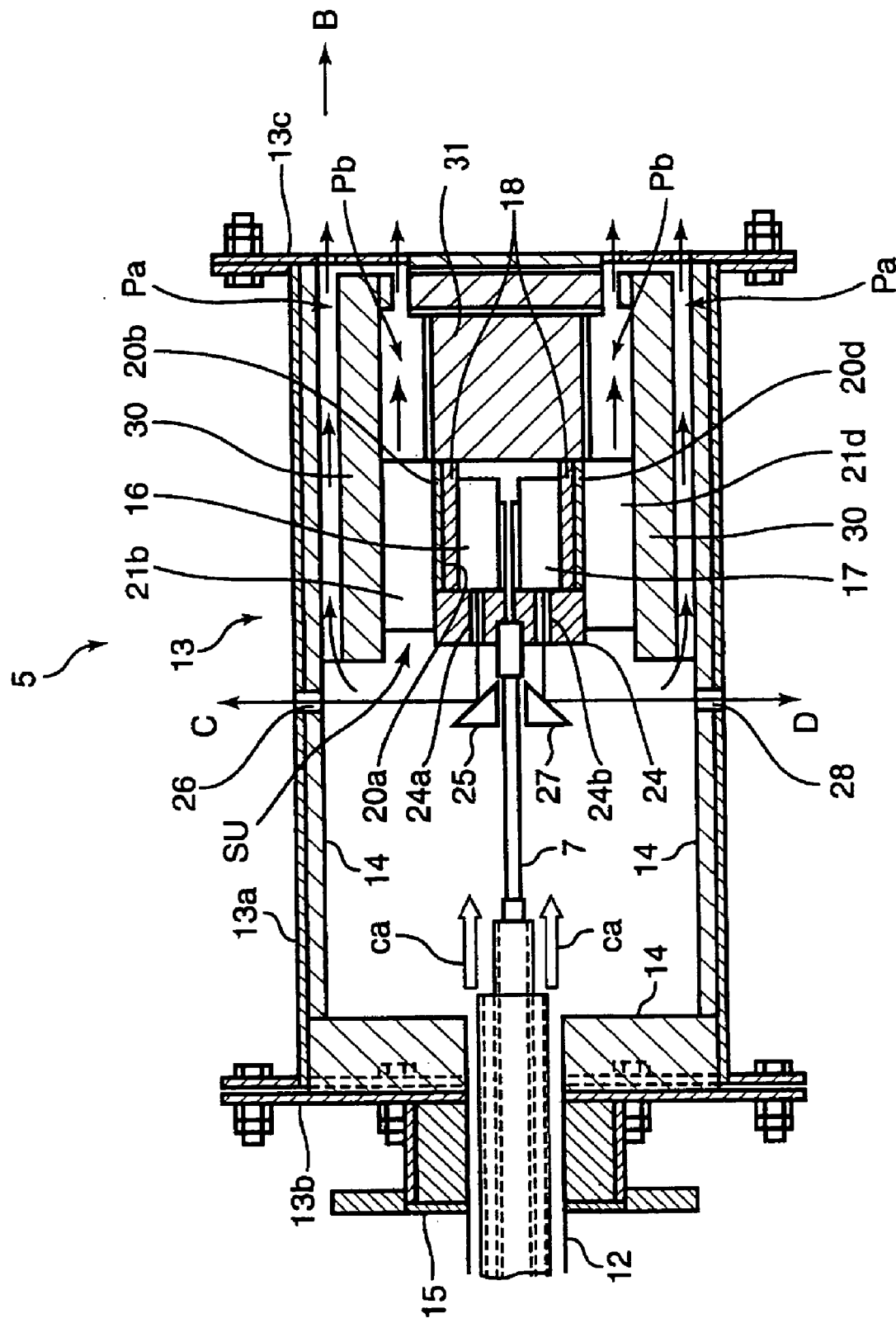
FIG. 2 is a plan sectional view of the oven width measuring instrument illustrated in FIG. 1.

FIG. 2 is a sectional enlarged view of the oven width measuring instrument 5, which is illustrated in plan.

In FIG. 2, the oven width measuring instrument 5 has a heat-insulated housing 13 in a box form. Inside this housing 13, minimum requirement devices, such as the laser displacement sensors, the Peltier elements and thermocouples for temperature control, are stored.

Specifically, the housing 13 is composed of a rectangular tube-like part 13a, a rear face plate 13b for closing the rear side (the rear side in an oven cover direction B) end face of this rectangular tube-like part 13a, and a front face plate 13c arranged on the front side. A ceramic heat insulating material 14 is adhered onto each of inner faces of the rectangular tube-like part 13a and an inner face of the rear face plate 13b.

The rear face plate 13b is equipped with a connecting part 15 to which the heat insulating pipe 12 should be connected. Through the heat insulating pipe 12, cooling air ca is introduced to the housing 13. A power source is supplied to a pair of laser displacement sensors 16 and 17 through a power supply cable in the signal/power supply cable 7. Measured oven width signals are outputted through signal cables therein. Control signals for controlling the temperatures of the Peltier elements 20 and 21 are transmitted through a control cable out of the signal cables. The heat insulating pipe 12 in the connecting part 15 functions as an introduction part for introducing the cooling air ca.

The laser displacement sensors 16 and 17 are each a known sensor wherein a beam emitting element made of a semiconductor laser and a beam receiving element are accommodated in an outer package (case) made of an aluminum die cast, and the sensors 16 and 17 are provided in such a manner that a laser beam is concentrated through a beam emitting lens and irradiated to the walls of the oven, and then the laser beam reflected on the oven wall is partially passed through a beam receiving lens so as to be detected on the beam receiving element. It is preferred to use, as the laser displacement sensors 16 and 17, for example, sensors of a super long range type, wherein the measuring range is of 320 mm±150 mm.

The laser displacement sensors 16 and 17 are arranged in parallel with each other along the direction in which the ram beam 2 is traveled, and their beam emitting parts are arranged toward the direction opposite to the direction of the arrow B.

Figure 3:
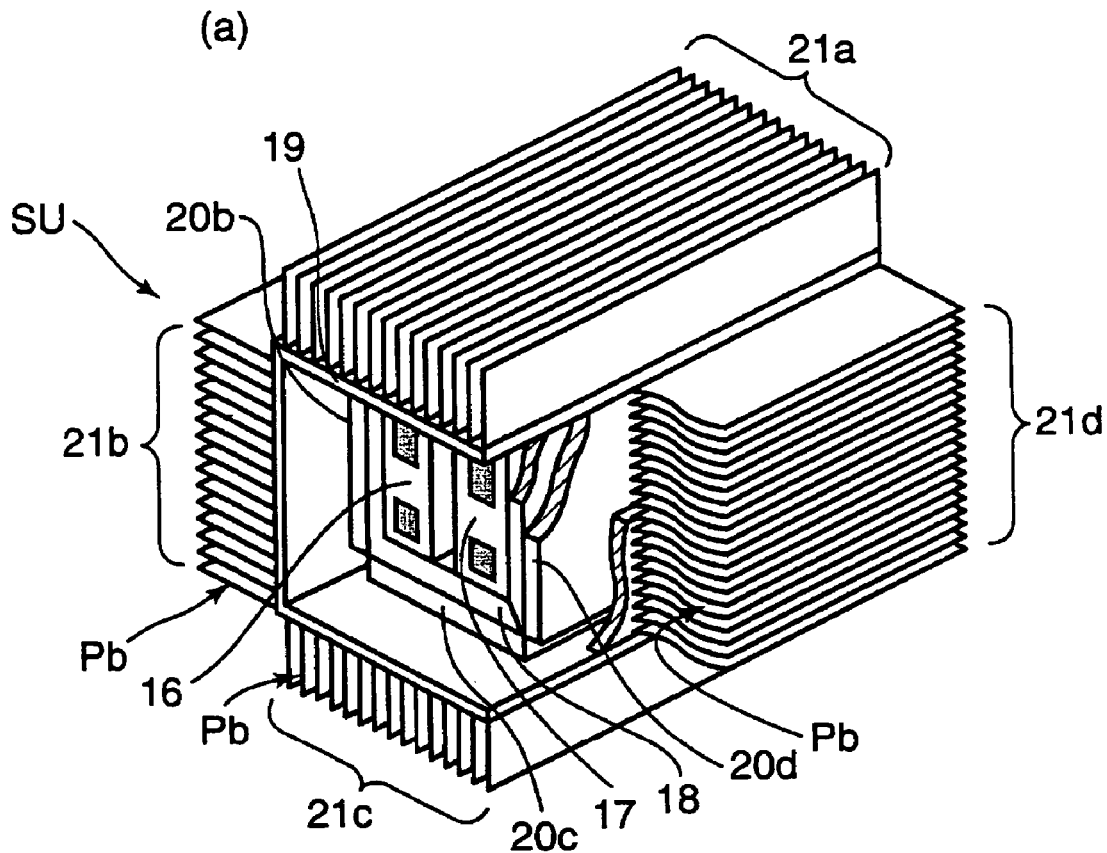
FIG. 3(a) is a partially cutaway perspective view illustrating the structure of a sensor unit.
FIG. 3(b) is a front view thereof.
Figure 3:
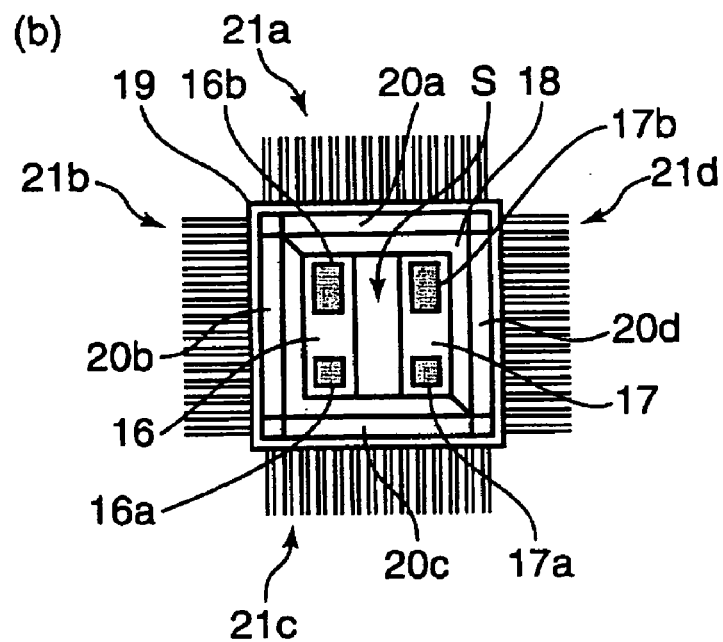

FIGS. 3(a) and 3(b) illustrate a sensor unit SU wherein a cooling structure is added to the laser displacement sensors 16 and 17, so as to be integrated therewith. FIG. 3(a) is a perspective view thereof, and FIG. 3(b) is a front view thereof. In FIG. 3(a), the unit is illustrated in the state that a cover 24 (see FIG. 2) ahead of the laser displacement sensors 16 and 17 is removed and the individual members or parts of the sensor unit SU are partially cut away for easy outstanding of the respective members or parts.

In FIGS. 3(a) and 3(b), the sensor unit SU is composed mainly of the laser displacement sensors 16 and 17 arranged to be lined from side to side, an inner frame 18, as a thermal conductor, made of aluminum and arranged in the form of a rectangular tube so as to surround the periphery of the laser displacement sensors 16 and 17, four Peltier elements 20a-20d arranged to be adhered closely to the outer circumferential face of this inner frame 18, an outer frame 19 made of aluminum and arranged in the form of a rectangular tube so as to be adhered closely to the outer faces of the Peltier elements 20a-20d, and cooling fin groups 21a-21d formed to be integrated with the respective outer circumferential faces of this outer frame 19.

The inner frame 18 is composed of two half pieces in order to be easily maintained.

The Peltier elements 20a-20d are each formed by laminating two plate-like Peltier elements onto each other, and are arranged to direct the heat absorbing faces thereof to the laser displacement sensors 16 and 17, and direct the heat radiating faces thereof to the cooling fin groups 21a-21d.

In a gap S between the laser displacement sensors 16 and 17, cords connected to the sensors 16 and 17, respectively, are wired.

In FIG. 3(b), reference numerals 16a and 17a represent beam emitting parts, and reference numerals 16b and 17b represent beam receiving parts.

When the sensor unit SU is made in this way, the surface temperatures of the laser displacement sensors 16 and 17 can be controlled through the inner frame 18 by the Peltier elements 20a-20d. The heat generated in the Peltier elements 20a-20d are radiated through the cooling fin groups 21a-21d formed in the outer frame 19.

Returning to FIG. 2, the following description will be made.

The beam emitting side of the laser displacement sensors 16 and 17 is covered with the cover 24, which is made of a heat insulating material, so as to cause the cooling air ca not to flow into any region other the cooling fin groups 21a-21d. Laser beams from the laser displacement sensors 16 and 17 are emitted through through-holes 24a and 24b, respectively, which are made partially in the cover 24.

A reflecting mirror 25, wherein aluminum is vapor-deposited, is arranged on the beam emitting side of the laser displacement sensor 16. The optical path of the laser beam emitted from the laser displacement sensor 16 is varied by 90° (the direction of an arrow C in FIG. 2) on the reflecting mirror 25. Through a measurement window 26 installed in the rectangular tube-like part 13a, the laser beam is emitted onto one of the walls of the oven and the beam reflected from the oven wall is received.

On the beam emitting side of the laser displacement sensor 17 also, a reflecting mirror 27 having the same structure as the reflecting mirror 25 is arranged in such a manner that the mirrors are bilaterally symmetric. The optical path of the laser beam is varied by 90° (the direction of an arrow D) on this reflecting mirror 27. Through a measurement window 28 made in the rectangular tube-like part 13a, the laser beam is emitted onto the other wall of the oven and the reflected laser beam is received.

Since the measurement windows 26 and 28 each have a small opening area, radiant heat through the windows from the oven walls can be cooled by heat exchange with the cooling air ca. When a glass plate which consist of a silica glass coated with a thermal interruption filter is arranged in each of the measurement windows 26 and 28, the supply amount of the cooling air ca can be restrained.

In the meantime, on the front side of the housing 13, a rectangular tubular partitioning member (tubular heat insulating part) 30, which is somewhat smaller than the rectangular tube-like part 13a of the housing 13, is accommodated in the housing 13 in the state that a predetermined gap is present between each of the inner walls of the rectangular tube-like part 13a and the partitioning member 30. This partitioning member 30 is composed of a thin plate made of stainless steel, and a ceramic piece.

The gaps constitute a cooling passage Pa for causing a part of the cooling air ca to flow along the inner walls of the housing. The partitioning member 30 is partially connected to the housing inner walls through a rodlike members (not illustrated) arranged along the longitudinal direction of the housing.

The sensor unit SU is accommodated in this partitioning member 30.

In the state that the sensor unit SU is housed, fin outer circumferential ends of the cooling fin groups 21a-21d are connected to the inner walls of the partitioning member 30, so that the cooling air ca flows also into gaps between the individual fins of the cooling fin groups 21a-21d. The passage communicated with the individual gaps between these cooling fins constitutes a second cooling passage Pb.

Between the laser displacement sensors 16 and 17 and the front face plate 13c is arranged a heat insulating material 31, so that heat which is to invade the inside of the housing 13 through the front face plate 13c from the outside is blocked.

Incidentally, when the cooling air ca is supplied to the oven width measuring instrument 5 mounted on the front end side of the ram beam 2, the temperature of the cooling air ca supplied is raised to about 100° C. at the time when the cooling air ca reaches the oven width measuring instrument 5 even if the hose for supplying the cooling air ca is accommodated in the heat insulating pipe 12.

When the thus temperature-raised cooling air ca is introduced into the housing 13, the surface temperatures of the laser displacement sensors 16 and 17 rise up. On the other hand, the operation temperature range of the laser displacement sensors 16 and 17 is usually from 0 to +50° C. It is therefore necessary that the temperature of the cooling air ca the temperature of which rose up to 100° C. is lowered to about 50° C.

Hitherto, as an instrument equipped with a CCD camera as an electronic device in order to observe the inside of an oven, there have been instruments wherein Peltier elements are arranged as cooling means. However, according to such an instrument, wherein Peltier elements are merely arranged, the space inside the instrument wherein an electronic device is arranged is first cooled, and the electronic device is indirectly cooled through the cooled atmosphere, therefore, the instrument cannot be cooled to about 50° C.

On the other hand, in the oven width measuring instrument 5 of the present invention, the laser displacement sensors 16 and 17 are accommodated in the inner frame 18 made of aluminum excellent in thermal conductivity, and the heat absorbing sides of the Peltier elements 20a-20d are adhered closely to the inner frame 18. The cooling fin groups 21a-21d are attached to the heat radiating side of the Peltier elements 20a-20d to interpose the outer frame 19 made of aluminum between the elements and the fin groups. In this way, these members are integrated with each other, whereby the laser displacement sensors 16 and 17 can be cooled at a high efficiency.

Specifically, the surface temperatures of the laser displacement sensors 16 and 17 are monitored with thermocouples. When the surface temperatures are higher than 50° C., the Peltier elements 20a-20d are operated (or turned on). When the Peltier elements 20a-20d are turned on, the heat radiating side temperature is substantially equal to the temperature of the cooling air ca, and thus, the Peltier elements 20a-20d make it possible to stably cool the laser displacement sensors 16 and 17.

According to this manner, the surface temperatures of the laser displacement sensors 16 and 17 can be kept at 50° C. or lower, so that the laser displacement sensors 16 and 17 can stably be operated.

Heat which invades the inside of the oven width measuring instrument 5 from the outside of the housing 13 is firstly blocked with the heat insulating material 14 adhered to the inner walls of the housing 13. Even if the heat partially passes through the heat insulating material 14, almost all of the heat is deprived by the cooling air ca flowing in the cooling passage Pa. For this reason, the heat hardly produces an effect on the cooling air ca which passes through the cooling fin groups 21a-21d arranged toward the second cooling passage Pb.

In the embodiment, the beam emitting parts and the beam receiving parts of the laser displacement sensors 16 and 17 are arranged oppositely to the flow of the cooling air ca. Of course, however, the beam emitting and receiving parts may be reversely arranged.

Next, the control operation of the oven width measuring instrument 5 having the above-mentioned structure will be described with reference to FIG. 4.

When the coke oven door is opened in the pushing-out operation of pushing out red heat coke obtained by dry distillation in the carbonizing chambers, the push-out ram 3 is inserted into the carbonizing chamber so that the ram head 1 at the front end of the ram beam 2 pushes out the red heat coke.

During the push-out ram 3 is traveled in the carbonizing chambers, the oven width measuring instrument 5 mounted in the push-out ram 3 continuously measures the oven widths of the carbonizing chambers from the pushing-out machine side toward the guide car side.

As illustrated in FIG. 2, in operation, the cooling air ca is supplied through the pipe 12 to the oven width measuring instrument 5 constantly, and the cooling air ca supplied to the oven width measuring instrument 5 is separated into the cooling passage Pa and the second cooling passage Pb, so as to flow in the housing 13.

The cooling air ca flowing the cooling passage Pa absorbs heat which invades the inside of the housing 13 through the heat insulating material 14 adhered to the inner walls of the housing 13, and then the cooling air ca supplied for heat exchange is discharged from the openings provided in the front face plate 13c to the outside of the housing 13.

The laser displacement sensors 16 and 17 contact the heat absorbing side of the Peltier elements 20a-20d through the inner frame 18 arranged around the sensors 16 and 17, therefore, the Peltier elements 20a-20d are controlled by the controller 40, so that the sensors 16 and 17 are cooled.

Heat generated in the Peltier elements 20a-20d is transferred through the outer frame 19 (see FIG. 3(b)) to the cooling fin groups 21a-21d, and the cooling air ca is caused to flow at any time into the second cooling passage Pb arranged toward the cooling fin groups 21a-21d. As a result, the heat generated by the Peltier elements 20a-20d is discharged through the cooling air ca.

As illustrated in FIG. 1, a rack 2a is formed on the ram beam 2 along the longitudinal direction thereof, and a pinion 2b is engaged with the rack 2a. When this pinion 2b is rotated by a pushing-out motor not illustrated, the ram beam 2 is traveled.

Accordingly, when the rotation number of the pinion 2b is detected by a rotary encoder provided to the pushing-out motor, the travel distance of the push-out ram 3 can be calculated on the basis of the rotation number.

Figure 4:
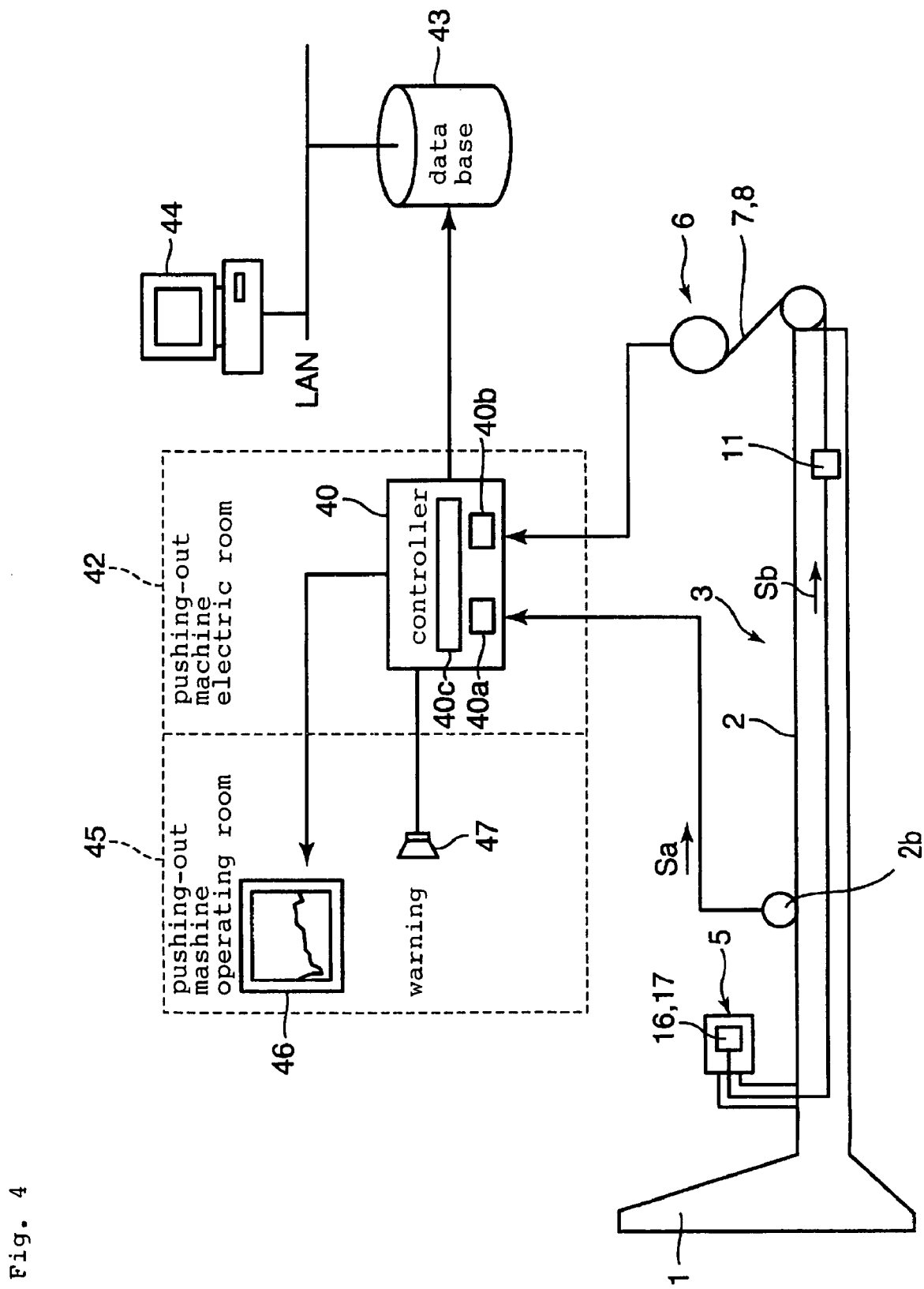
FIG. 4 is a block diagram illustrating a control system of the oven width measuring instrument according to the present invention.

In FIG. 4, position data Sa of the push-out ram 3 outputted from the rotary encoder are memorized in a position data memory part 40a of the controller 40.

The controller 40 is placed inside a pushing-out machine electric room 42.

Oven width data Sb measured by the oven width measuring instrument 5 at a predetermined cycle are sent through the amplifier unit, for the laser displacement sensors, in the converter 11, and then memorized in an oven width data memory part 40b in the controller 40. The position data and the oven width data correspond to each other by synchronizing the start timings thereof, and memorized in the memory parts 40a and 40b, respectively.

The oven width data Sb has an oven width data $Sb_1$ outputted from the laser displacement sensor 16 and an oven width data $Sb_2$ outputted from the laser displacement sensor 17. The oven width data $Sb_1$ corresponds to the distance from the beam emitting part of the laser displacement sensor 16 to one of the oven walls, and the oven width data $Sb_2$ corresponds to the distance from the beam emitting part of the laser displacement sensor 17 to the other wall. Thus, when the sum of the oven width data $Sb_1$ and $Sb_2$ is calculated in a data processing part 40c, the oven width of one of the carbonizing chamber can be measured. Since the reflecting mirrors 25 and 27 are used in the above embodiment, it is necessary to perform the correction for reducing the distances from the beam emitting parts of the laser displacement sensors 16 and 17 to the reflecting mirrors 25 and 27 respectively, and further adding a separate distance between the two reflecting mirrors 25 and 27.

The controller 40 adds, to the above-mentioned position data and the oven width data corresponding to each other, the measurement date, the measurement time, and the oven number of the carbonizing chamber to be measured. The resultant data are transmitted to a data base 43 and stored therein.

Personal computers 44 are connected through a LAN to this data base 43. As a result, a user accesses the data base 43 from any one of the personal computers 44, and inspects the transition of the oven width measured values, whereby the user can control the tendency of the oven width wall faces, and judge the time when the oven should be repaired.

The controller 40 also causes the oven width measured values to be plotted as a graph on a monitor 46 in the pushing-out machine operating room 45. In the graph, its lateral axis represents the measurement position, and its vertical axis represents the oven width. The left side of the graph and the right side thereof correspond to the pushing-out machine side and the guide car side, respectively.

When the oven width measured value measured by the oven width measuring instrument 5 is an abnormally large value, there is a possibility for generating a blasted hole on the oven walls. In this case, the controller 40 causes a speaker 47 to give a warning.

The measurement by use of the oven width measuring instrument 5 may be performed at the return stroke of the push-out ram 3 as well as push-out stroke of that.

INDUSTRIAL APPLICABILITY

The present invention can be used as an instrument for measuring the oven width of carbonizing chambers in a coke oven, and also as an instrument for measuring the oven width of a steel converter, a combustion furnace, an incinerating boiler, an electricity-producing boiler, or any other high-temperature furnace.

The invention claimed is:

1. An oven width measuring instrument, comprising:
   a sensor unit composed of an integrated combination of a laser displacement sensor containing a beam emitting element and a beam receiving element in an outer package,
   a plurality of plate-like thermoelectric cooling elements surrounding the outer package and arranged so as to direct their heat absorbing faces toward the outer package,
   a thermal conductor embedded in the gap between the outer package and the heat absorbing faces of the thermoelectric cooling elements, and
   cooling fins arranged on a heat radiating faces of the thermoelectric cooling elements; and
   a housing having an introduction part for introducing cooling air, a discharging part for discharging the cooling air used for cooling, and a measurement window through which a laser beam is passed, wherein
   the sensor unit is accommodated in the housing.

2. The oven width measuring instrument according to claim 1, wherein the sensor unit is accommodated in the housing to interpose a tubular heat insulating part between the sensor unit and the housing, and a cooling passage in which the cooling air is caused to flow is formed between an outer wall of the heat insulating part and an inner wall of the housing.

3. The oven width measuring instrument according to claim 2, wherein a heat insulating material is adhered onto the inner wall of the housing.

4. The oven width measuring instrument according to claim 2, wherein the peripheries of the cooling fins are closed by the tubular heat insulating part, and gaps between the individual cooling fins constitute a second cooling passage in which the cooling air is caused to flow.

5. A push-out ram provided with an oven width measuring instrument, wherein the instrument which is an oven width measuring instrument according to claim 1 is mounted on a ram beam of the push-out ram which is a push-out ram arranged in a coke oven.

6. The push-out ram provided with the oven width measuring instrument according to claim 5, wherein the following are accommodated in a heat insulating pipe laid on the ram beam: a hose for supplying cooling air to the oven width measuring instrument, a cable for supplying a power source to the laser displacement sensors and the thermoelectric cooling elements, and further outputting oven width measured data, and a cable for transmitting a control signal for controlling the temperatures of the thermoelectric cooling elements.

7. The push-out ram provided with the oven width measuring instrument according to claim 6, wherein the ram beam is equipped with a tank for storing the cooling air and a compressor for keeping the cooling air in this tank at a predetermined pressure.

8. A push-out ram provided with an oven width measuring instrument, wherein the instrument which is an oven width measuring instrument according to claim 2 is mounted on a ram beam of the push-out ram which is a push-out ram arranged in a coke oven.

9. A push-out ram provided with an oven width measuring instrument, wherein the instrument which is an oven width measuring instrument according to claim 3 is mounted on a ram beam of the push-out ram which is a push-out ram arranged in a coke oven.

10. A push-out ram provided with an oven width measuring instrument, wherein the instrument which is an oven width measuring instrument according to claim 4 is mounted on a ram beam of the push-out ram which is a push-out ram arranged in a coke oven.

* * * * *